(12) United States Patent
Chen et al.

(10) Patent No.: US 11,771,181 B2
(45) Date of Patent: Oct. 3, 2023

(54) BUCKLE ASSEMBLY

(71) Applicant: China Bambino Prezioso Co., Ltd., Guangdong (CN)

(72) Inventors: Yingzhong Chen, Guangdong (CN); Qinrui Wei, Guangdong (CN)

(73) Assignee: China Bambino Prezioso Co., Ltd., Guangdong (CN)

( * ) Notice: Subject to any disclaimer, the term of this patent is extended or adjusted under 35 U.S.C. 154(b) by 245 days.

(21) Appl. No.: 17/096,929

(22) Filed: Nov. 12, 2020

(65) Prior Publication Data

US 2021/0145130 A1 May 20, 2021

(30) Foreign Application Priority Data

Nov. 15, 2019 (CN) .......................... 201921983478.5

(51) Int. Cl.
*A44B 11/25* (2006.01)
*B60R 22/18* (2006.01)

(52) U.S. Cl.
CPC ....... *A44B 11/2511* (2013.01); *A44B 11/2573* (2013.01); *B60R 2022/1806* (2013.01); *B60R 2022/1812* (2013.01)

(58) Field of Classification Search
CPC ............ A44B 11/2503; A44B 11/2507; A44B 11/2511; A44B 11/2549; A44B 11/2573; A44B 11/2561; A44B 11/263; B60R 2022/1806; B60R 2022/1812; B60R 22/10; B60R 22/105; A47D 15/005; A47D 15/006
See application file for complete search history.

(56) References Cited

U.S. PATENT DOCUMENTS

| 4,677,715 A * | 7/1987 | Escaravage ......... A44B 11/2511 24/641 |
| 5,117,663 A * | 6/1992 | Ida ....................... A44B 11/263 70/64 |
| 5,142,748 A * | 9/1992 | Anthony ............ A44B 11/2561 24/642 |

(Continued)

FOREIGN PATENT DOCUMENTS

| CA | 2485809 A1 * | 4/2005 | ......... A44B 11/2549 |
| CN | 211354108 U * | 8/2020 | ......... A44B 11/2511 |
| CN | 112790483 A * | 5/2021 | ......... A44B 11/2503 |
| CN | 114431579 A * | 5/2022 | |

(Continued)

*Primary Examiner* — Ryan D Kwiecinski
(74) *Attorney, Agent, or Firm* — Winston Hsu

(57) ABSTRACT

A buckle assembly includes a first buckle, a second buckle, an operating portion, a locking component and a resilient portion. The first buckle includes an inserting end whereon an engaging portion is formed. An installation slot is formed on the second buckle for receiving the inserting end. The operating portion is disposed on the second buckle, and the locking component is fixedly connected to the operating portion. The locking component can be locked with or released from the engaging portion. The resilient portion is biased to separate the inserting end from the installation slot. The operating portion is operated to drive the locking component to release from the engaging portion. The inserting end can be separated from the installation slot by the resilient portion, so as to unlock the first buckle and the second buckle. The buckle assembly has advantages of easy operation and simplified structure.

11 Claims, 9 Drawing Sheets

(56) References Cited

U.S. PATENT DOCUMENTS

| | | | | |
|---|---|---|---|---|
| 5,283,933 | A * | 2/1994 | Wiseman | A44B 11/2549 24/642 |
| 5,406,681 | A * | 4/1995 | Olson | A44B 11/2561 24/579.11 |
| 7,698,791 | B2 * | 4/2010 | Pezza | A44B 11/2549 24/579.11 |
| 8,656,566 | B1 * | 2/2014 | Chen | A44B 11/2511 24/642 |
| 10,357,083 | B2 * | 7/2019 | Babin | A44B 11/2561 |
| 10,455,902 | B2 * | 10/2019 | Kuang | A44B 11/2549 |
| 10,813,414 | B2 * | 10/2020 | Yokoi | A44B 11/2569 |
| 11,140,946 | B2 * | 10/2021 | Cheng | A44B 11/2592 |
| 2004/0003486 | A1 * | 1/2004 | Dingman | A44B 11/2511 24/177 |
| 2018/0078001 | A1 * | 3/2018 | Babin | A44B 11/2511 |
| 2020/0156589 | A1 * | 5/2020 | Babin | B60N 2/265 |
| 2021/0145130 | A1 * | 5/2021 | Chen | A44B 11/263 |
| 2021/0204658 | A1 * | 7/2021 | Jessup | A44B 11/2523 |
| 2022/0363219 | A1 * | 11/2022 | Guo | B60R 22/48 |

FOREIGN PATENT DOCUMENTS

| | | | | |
|---|---|---|---|---|
| CN | 114587051 A | * | 6/2022 | |
| DE | 102010005795 B3 | * | 6/2011 | ......... A44B 11/2503 |
| EP | 2 236 351 A1 | | 10/2010 | |
| EP | 2236351 A1 | * | 10/2010 | ........... A41D 13/008 |
| EP | 2 236 351 B1 | | 12/2011 | |
| EP | 2 601 853 A1 | | 6/2013 | |
| EP | 2601853 A1 | * | 6/2013 | ......... A44B 11/2511 |
| GB | 2027790 A | * | 2/1980 | ......... A44B 11/2507 |
| GB | 2249340 A | * | 5/1992 | ......... A44B 11/2503 |
| JP | 59-168803 A | | 9/1984 | |
| JP | 3-27709 U | | 3/1991 | |
| JP | 3-49702 A | | 3/1991 | |
| JP | 6-504701 A | | 6/1994 | |
| JP | 2002-154402 A | | 5/2002 | |
| JP | 2002154402 A | * | 5/2002 | |
| WO | 92/15216 A1 | | 9/1992 | |
| WO | WO-9215216 A1 | * | 9/1992 | ......... A44B 11/2511 |
| WO | WO-2017059437 A1 | * | 4/2017 | ......... A44B 11/2503 |
| WO | WO-2020061188 A1 | * | 3/2020 | ......... A44B 11/2503 |
| WO | WO-2021094547 A1 | * | 5/2021 | ......... A44B 11/2503 |

* cited by examiner

BUCKLE ASSEMBLY

BACKGROUND OF THE INVENTION

1. Field of the Invention

The present invention relates to a buckle assembly, and more particularly, to a buckle assembly having advantages of simplified structure and easy operation.

2. Description of the Prior Art

Current baby carrying devices, such as strollers, safety seats, baby swings, etc., are equipped with safety belt buckles to prevent infants from falling. The safety belt buckles usually include a female buckle, a pair of male buckles connected with a waist belt, and a pair of shoulder belt buckles connected with shoulder belts. When the male buckles and the shoulder belt buckles are locked on the female buckle, the waist belt and the shoulder straps on the infant can prevent the infant from falling out of the stroller, the safety seat, or the baby swing. However, in the current safety belt buckle, since the shoulder belt buckle and the female buckle do not have any resilient mechanism, it takes a lot of effort to release the shoulder belt buckle from the female buckle. Therefore, it is necessary to provide a convenient buckle for solving the aforementioned problems.

SUMMARY OF THE INVENTION

Therefore, an objective of the present invention is to provide a buckle assembly having advantages of simplified structure and easy operation, for solving the aforementioned problems.

In order to achieve the aforementioned objective, the present invention discloses a buckle assembly including a first buckle, a second buckle, an operating portion, a locking component and a resilient portion. The first buckle includes an inserting end whereon an engaging portion is formed. The second buckle can buckle with the first buckle, and an installation slot is formed on the second buckle for receiving the inserting end. The operating portion is disposed on the second buckle. The locking component is fixedly connected to the operating portion, and the locking component is configured to lock with or release from the engaging portion. The resilient portion is biased to separate the inserting end from the installation slot, the operating portion is operated to drive the locking component to release from the engaging portion, and the inserting end separates from the installation slot by the resilient portion, so as to unlock the first buckle and the second buckle.

Preferably, an end of the operating portion passes through the second buckle to fixedly connect with the locking component disposed in the installation slot.

Preferably, the operating portion includes a pressing part and at least one extending part connected to each other, a penetrating hole is formed on the second buckle, and the at least one extending part passes through the penetrating hole to connect with the locking component.

Preferably, an indentation is formed on the second buckle for receiving the pressing part.

Preferably, a recovering portion is installed between the pressing part and the indentation for biasing the pressing part to separate from the indentation.

Preferably, a positioning notch is formed in the indentation for positioning the recovering portion.

Preferably, a receiving portion is formed on the second buckle, the inserting end is located between the locking component and the operating portion, and the operating portion is operated to drive the locking component to the receiving portion so as to release from the engaging portion.

Preferably, a hook slot is recessed inwardly on the inserting end to form the engaging portion.

Preferably, the second buckle includes a buckling body and a cover engaged with the buckling body.

Preferably, the buckling body includes a latching part, and the cover includes a blocking part for engaging with the latching part.

Preferably, the first buckle further includes a left buckling component and a right buckling component connected to each other, the left buckling component includes a first upper portion and a first lower portion, the right buckling component includes a second upper portion and a second lower portion, the first upper portion and the second upper portion are arranged in a left and right direction, the first lower portion and the second lower portion are arranged in a forward and backward direction, and the first lower portion and the second lower portion form the inserting end cooperatively.

Preferably, an end of the first lower portion bends to form a first protruding portion, an end of the second lower portion bends to form a second protruding portion, and the second protruding portion is located above the first protruding portion.

Preferably, the first protruding portion includes a tongue part, and the second protruding portion includes a sunken part for engaging with the tongue part.

Preferably, a fixing portion is installed between a bottom of the inserting end and the resilient portion, and the resilient portion pushes the fixing portion to move toward the inserting end.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

Figure 1:
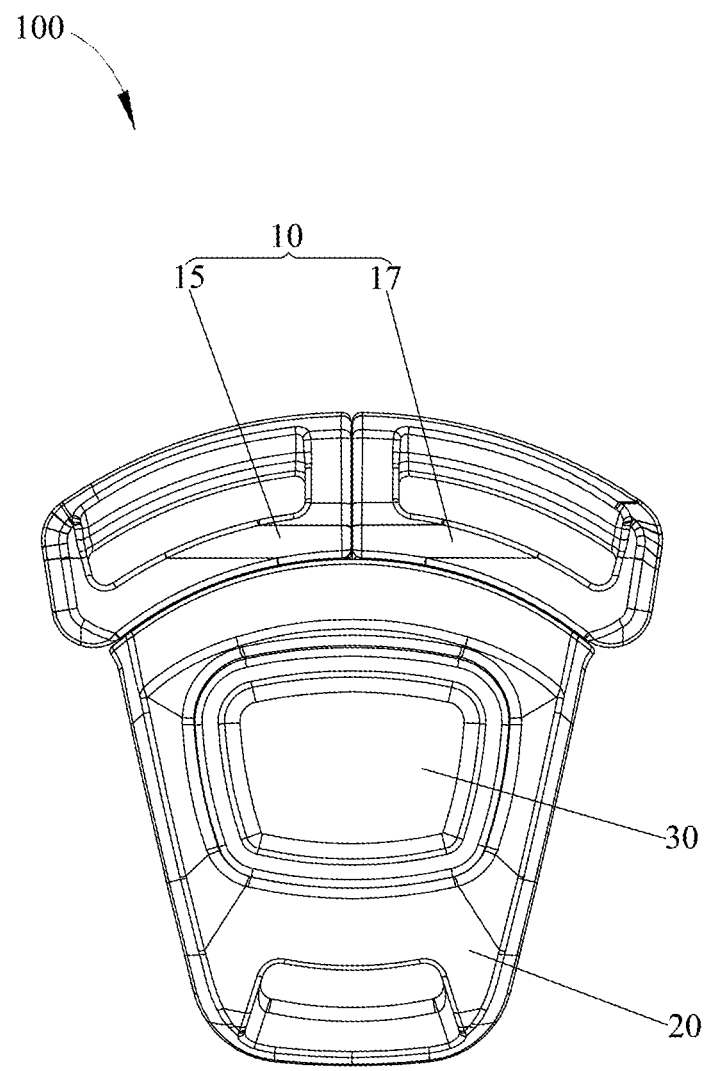
FIG. 1 is a schematic drawing of a buckle assembly according to an embodiment of the present application.
Figure 2:
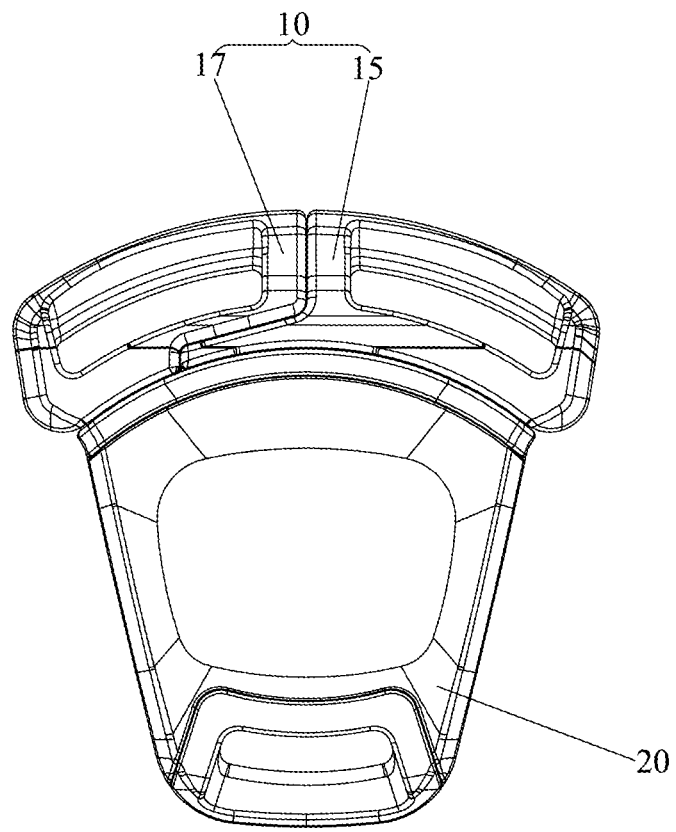
FIG. 2 is a schematic drawing of the buckle assembly at another view according to the embodiment of the present application.
Figure 3:
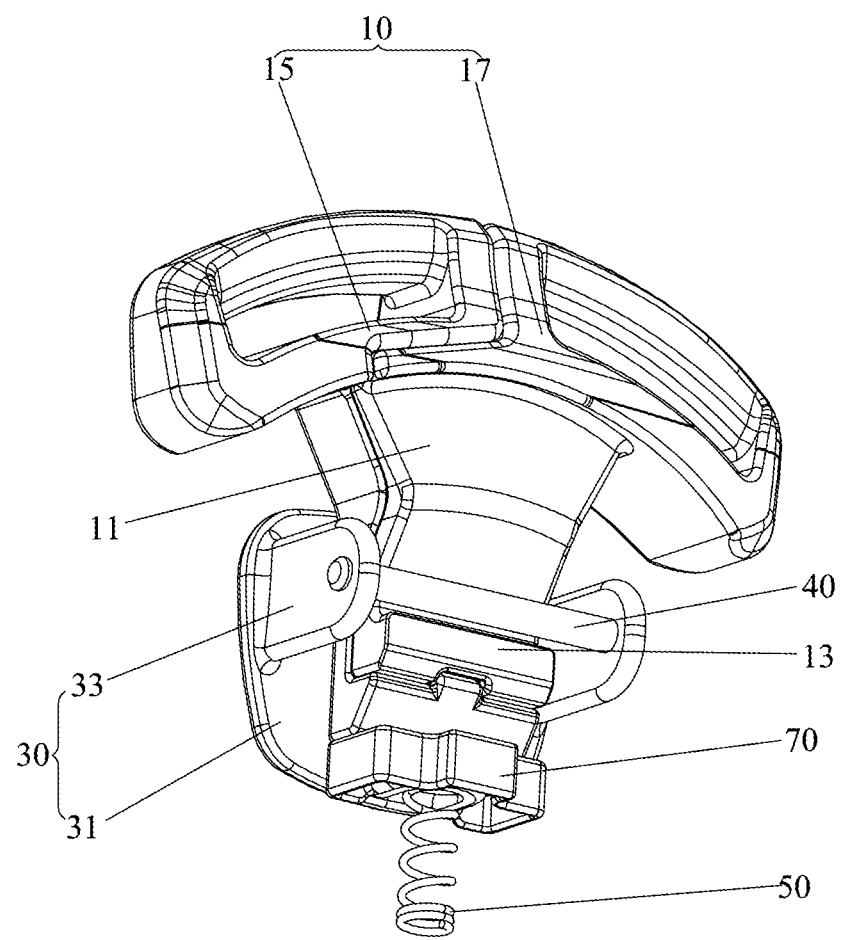
FIG. 3 is a diagram of the buckle assembly without illustrating a second buckle according to the embodiment of the present application.
Figure 4:
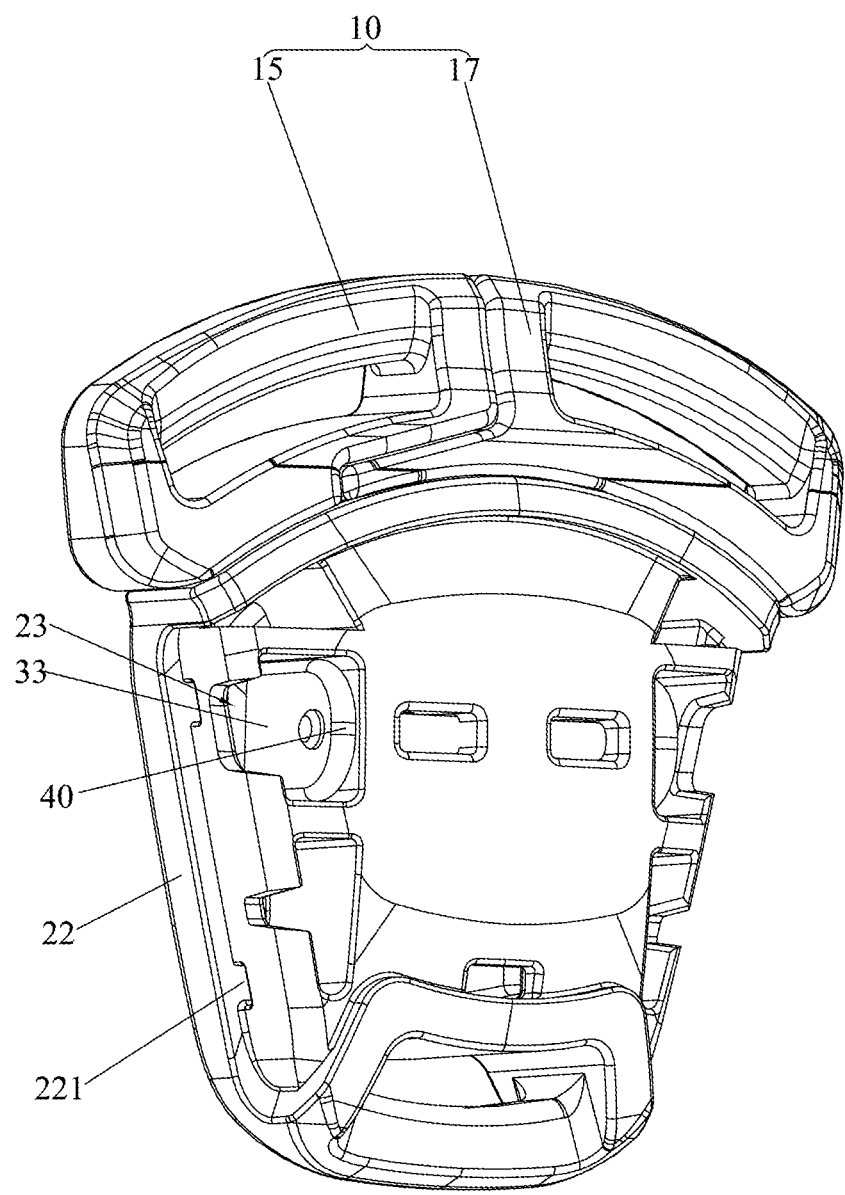
FIG. 4 is a diagram of the buckle assembly without illustrating a cover according to the embodiment of the present application.
Figure 5:
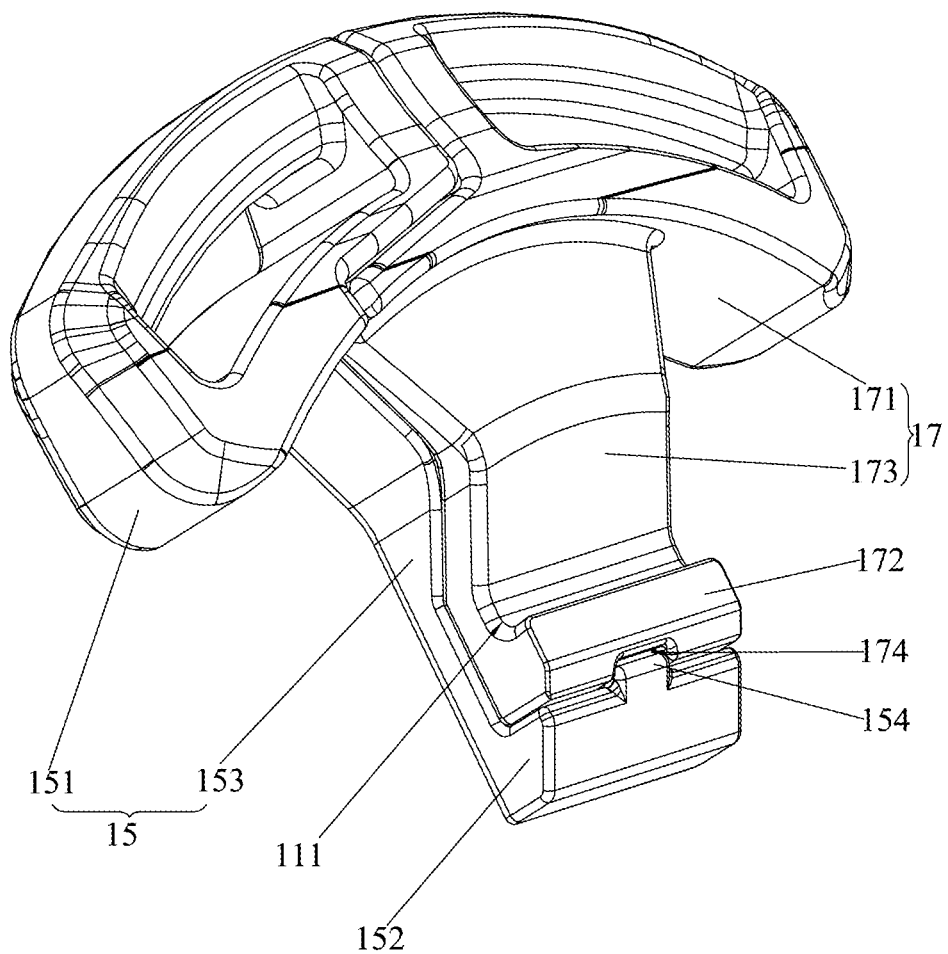
FIG. 5 is a diagram of a first buckle of the buckle assembly according to the embodiment of the present application.
Figure 6:
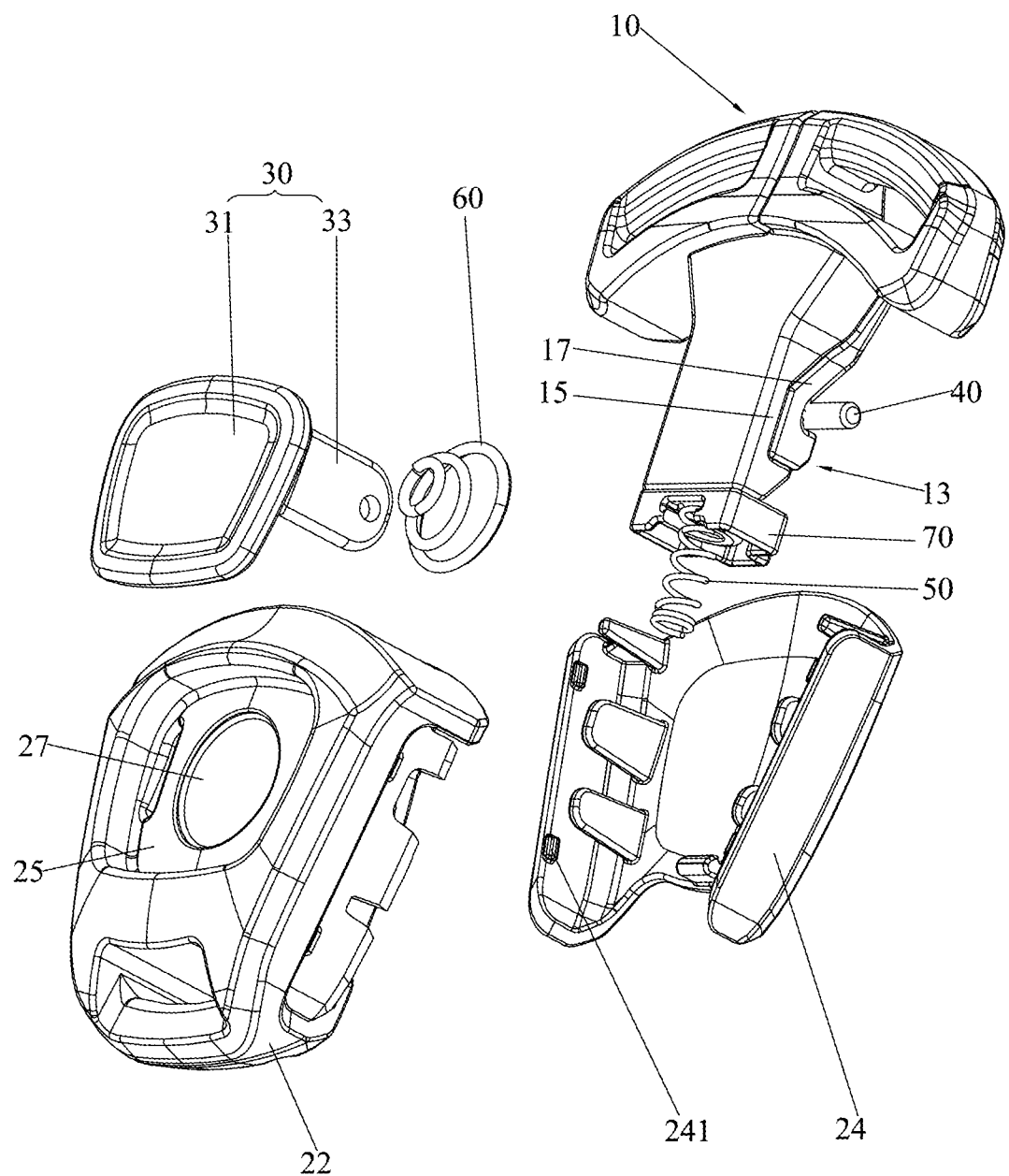
FIG. 6 is an exploded diagram of the buckle assembly according to the embodiment of the present application.

Please refer to FIG. 1 to FIG. 6. FIG. 1 is a schematic drawing of a buckle assembly 100 according to an embodiment of the present application. FIG. 2 is a schematic drawing of the buckle assembly 100 at another view according to the embodiment of the present application. FIG. 3 is a diagram of the buckle assembly 100 without illustrating a second buckle 20 according to the embodiment of the present application. FIG. 4 is a diagram of the buckle assembly 100 without illustrating a cover 24 according to the embodiment of the present application. FIG. 5 is a diagram of a first buckle 10 of the buckle assembly 100 according to the embodiment of the present application. FIG. 6 is an exploded diagram of the buckle assembly 100 according to the embodiment of the present application. The buckle assembly 100 includes the first buckle 10, the second buckle 20, an operating portion 30, a locking component 40, and a resilient portion 50. The first buckle 10 includes an inserting end 11 whereon the engaging portion 13 is formed. The first buckle 10 and the second buckle 20 can buckle with each other. An installation slot 21 is formed on the second buckle 20 for receiving the inserting end 11. The operating portion 30 is disposed on the second buckle 20. The locking component 40 is fixedly connected to the operating portion 30, and the locking component 40 is configured to lock with or release from the engaging portion 13. The resilient portion 50 is biased to separate the inserting end 11 from the installation slot 21, and the operating portion 30 can be operated to drive the locking component 40 to release from the engaging portion 13 by external force. The inserting end 11 can separate from the installation slot 21 by the resilient portion 50, so as to unlock the first buckle 10 and the second buckle 20. The first buckle 10 and the second buckle 20 can be engaged with each other by an insertion mechanism. The first buckle 10 can be a shoulder belt buckle or a male buckle, and the second buckle 20 can be a female buckle. The resilient portion 50 can be a spring. However, the present invention is not limited to this embodiment. The operating portion 30 can be operated by external force, so as to release the locking component 40 from the engaging portion 13, and then the resilient portion 50 provides a resilient force to push the inserting end 11, so as to disengage the first buckle 10 from the second buckle 20 for achieving an unlocking operation. Therefore, the present invention has advantages of simplified structure and easy operation.

Figure 8:
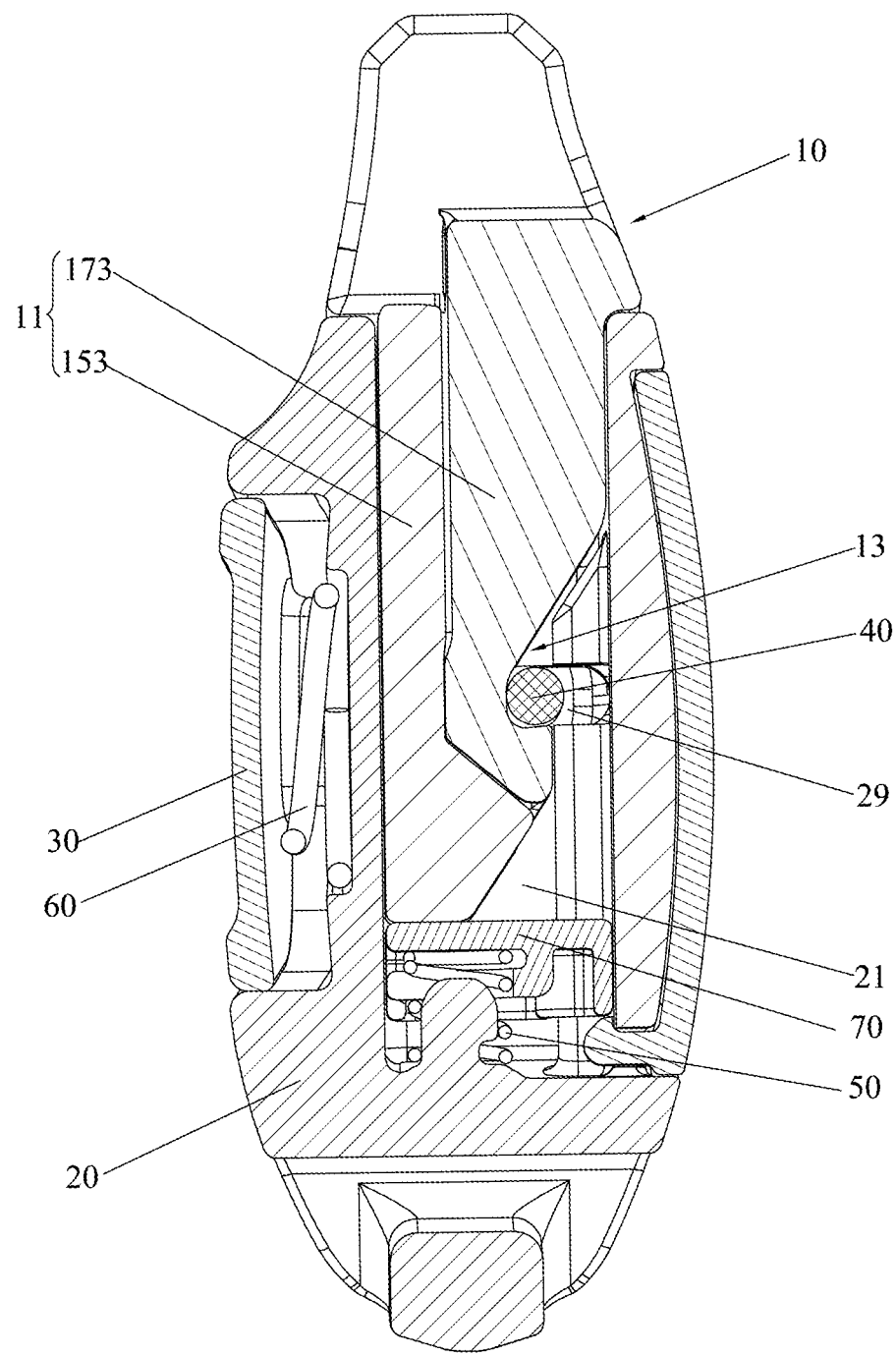
FIG. 8 is a sectional diagram of a locking component and an engaging portion engaging with each other according to the embodiment of the present application.
Figure 9:
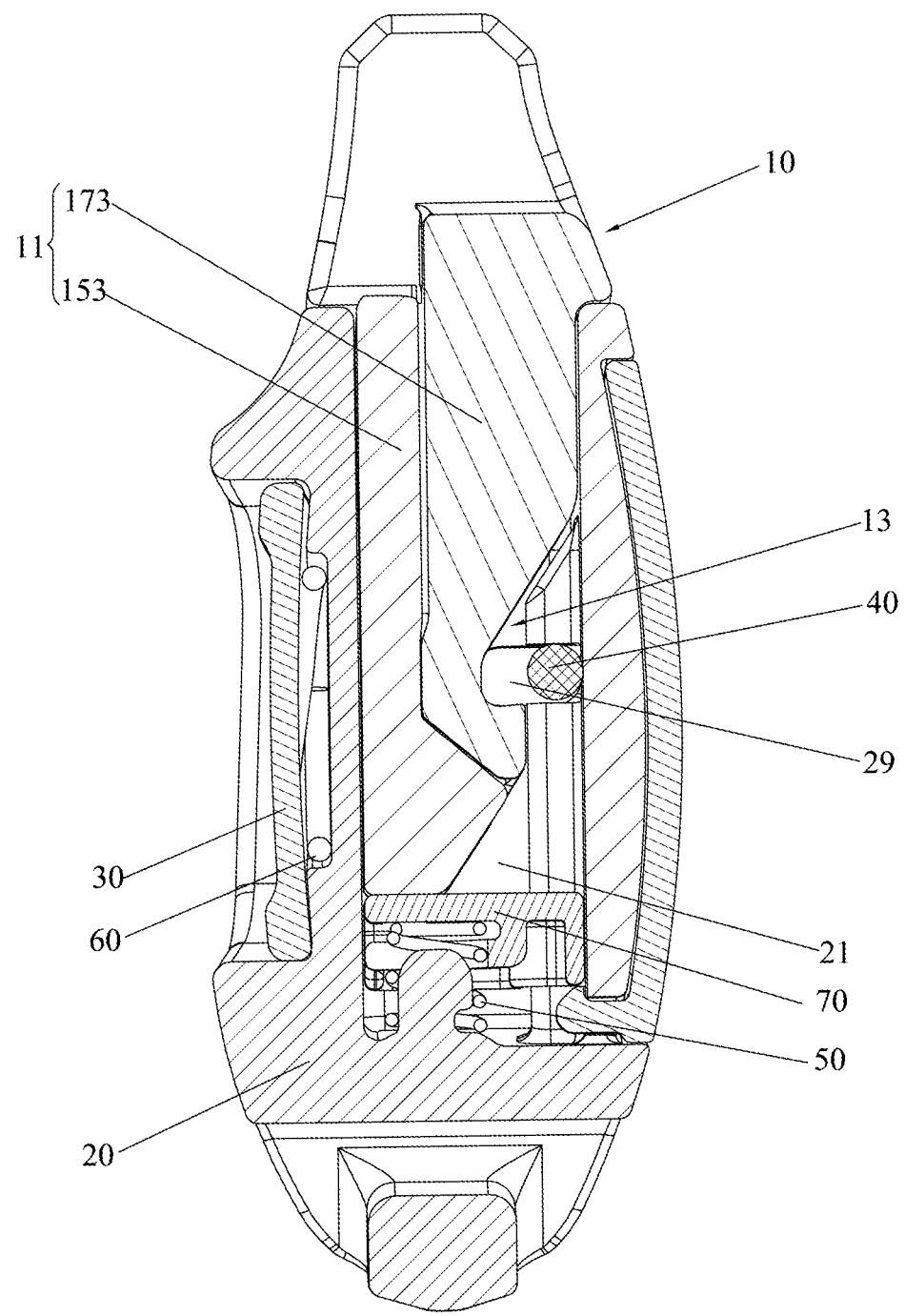
FIG. 9 is a sectional diagram of the locking component and the engaging portion releasing from each other according to the embodiment of the present application.

As shown in FIG. 3 and FIG. 4, an end of the operating portion 30 passes through the second buckle 20 to fixedly connect with the locking component 40 disposed in the installation slot 21. That is, the operating portion 30 and the locking component 40 can move synchronously and in a same direction. Specifically, the operating portion 30 includes a pressing part 31 and at least one extending part 33 connected to each other, a penetrating hole 23 is formed on the second buckle 20, and the extending part 33 passes through the penetrating hole 23 to connect with the locking component 40. In this embodiment, the operating portion 30 includes two extending parts 33, an end of each extending part 33 is connected to the pressing part 31, another end of each extending part 33 passes through the penetrating hole 23 to extend into the installation slot 21, and the locking component 40 is installed between the two extending parts 33. The pressing part 31 and the two extending parts 33 can be formed integrally, so as to extend service life of the operating portion 30. Furthermore, an indentation 25 is formed on the second buckle 20 for receiving the pressing part 31, so that the pressing part 31 can be rapidly installed and positioned by the indentation 25. Preferably, a recovering portion 60 is installed between the pressing part 31 and the indentation 25 for biasing the pressing part 31 to separate from the indentation 25. The recovering portion 60 can be a spring, but is not limited to it. For convenient installation of the recovering portion 60, a positioning notch 27 is formed in the indentation 25 for positioning the recovering portion 60. Please refer to FIG. 8 and FIG. 9. FIG. 8 is a sectional diagram of the locking component 40 and the engaging portion 13 engaging with each other according to the embodiment of the present application. FIG. 9 is a sectional diagram of the locking component 40 and the engaging portion 13 releasing from each other according to the embodiment of the present application. A receiving portion 29 is formed on the second buckle 20, the inserting end 11 is located between the locking component 40 and the operating portion 30, and the operating portion 30 can be operated to drive the locking component 40 to the receiving portion 29 so as to release from the engaging portion 13.

As shown in FIG. 5, a hook slot 111 is recessed inwardly on the inserting end 11 to form the engaging portion 13. Specifically, in this embodiment, the first buckle 10 further includes a left buckling component 15 and a right buckling component 17 connected to each other. The left buckling component 15 includes a first upper portion 151 and a first lower portion 153, the right buckling component 17 includes a second upper portion 171 and a second lower portion 173, the first upper portion 151 and the second upper portion 171 are arranged in a left and right direction, the first lower portion 153 and the second lower portion 173 are arranged in a forward and backward direction, and the first lower portion 153 and the second lower portion 173 form the inserting end 11 cooperatively. Furthermore, an end of the first lower portion 153 bends to form a first protruding portion 152, an end of the second lower portion 173 bends to form a second protruding portion 172, the second protruding portion 172 is located above the first protruding portion 152, and the first protruding portion 152 and the second protruding portion 172 form the engaging portion 13 cooperatively. The first protruding portion 152 includes a tongue part 154, and the second protruding portion 172 includes a sunken part 174 for engaging with the tongue part 154 so as to prevent false engagement.

Figure 7:
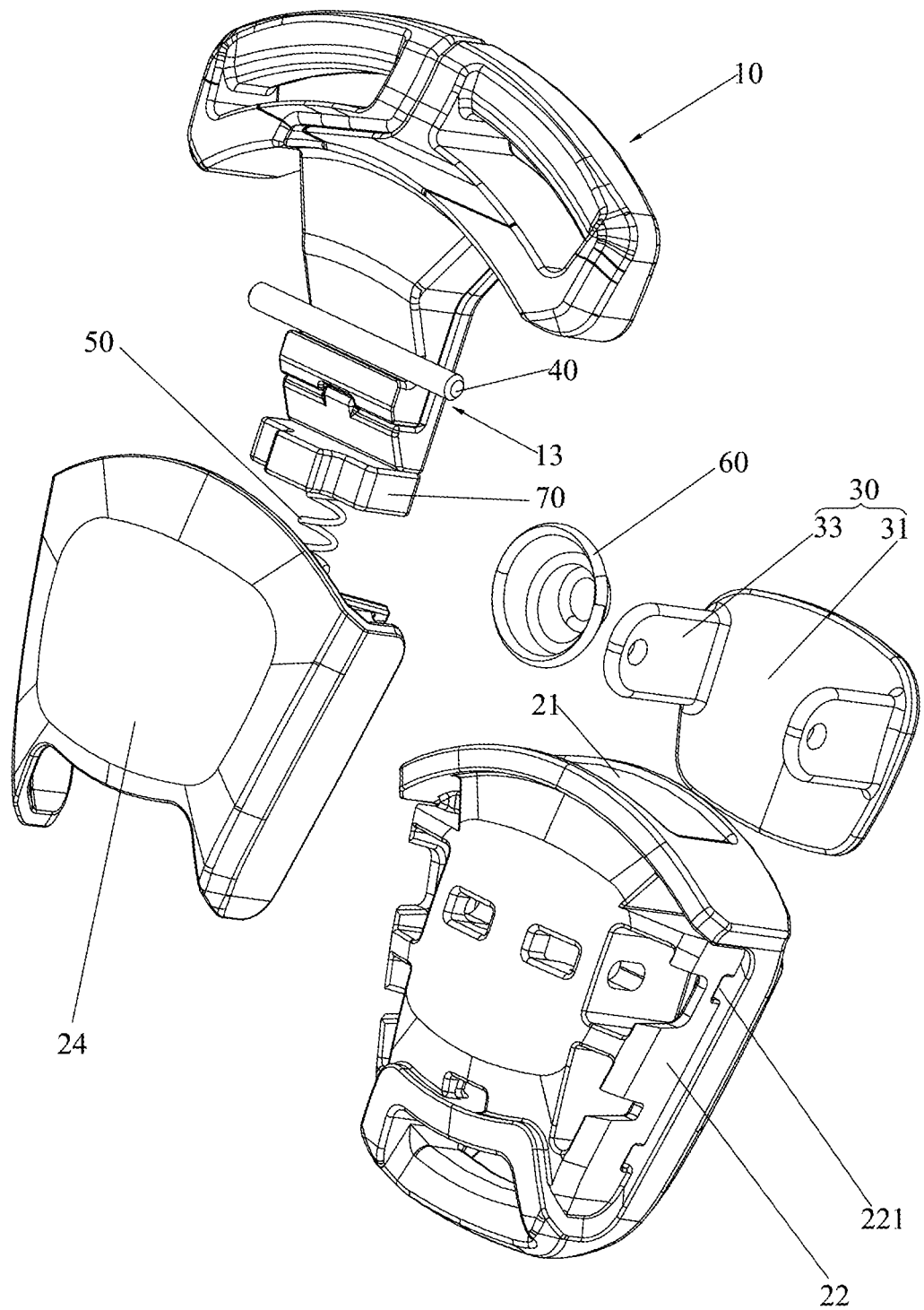
FIG. 7 is an exploded diagram of the buckle assembly at another view according to the embodiment of the present application.

As shown in FIG. 6 and FIG. 7, the second buckle 20 includes a buckling body 22 and the cover 24 engaged with the buckling body 22. Specifically, the buckling body 22 includes a latching part 221, and the cover 24 includes a blocking part 241 for engaging with the latching part 221, so as to connect the buckling body 22 and the cover 24 by cooperation of the latching part 221 and the blocking part 241.

As shown in FIG. 8 and FIG. 9, a fixing portion 70 is installed between a bottom of the inserting end 11 and the resilient portion 50, and the resilient portion 50 pushes the fixing portion 70 to move toward the inserting end 11, so as to push the inserting end 11 stably and smoothly.

Please refer to FIG. 1 to FIG. 9. The operational principle of the buckling assembly 100 is introduced as follows. At first, a user can apply external force to the pressing part 31, so as to drive the extending parts 33 to move the locking component 40 toward the receiving portion 29, so that the engaging portion 13 can disengage from the locking component 40. Then, the resilient portion 50 can push the inserting end 11 to separate from the installation slot 21, so as to unlock the first buckle 10 and the second buckle 20.

In contrast to the prior art, the operating portion 30 of the buckling assembly 100 of the present application can be operated by external force, so as to release the locking component 40 from the engaging portion 13, and then the resilient portion 50 provides the resilient force to push the inserting end 11 to separate from the installation slot 21, so as to unlock the first buckle 10 and the second buckle 20. Therefore, the present invention has advantages of simplified structure and easy operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A buckle assembly comprising:
   a first buckle comprising an inserting end whereon an engaging portion is formed, wherein the first buckle further comprises a left buckling component and a right buckling component connected to each other, the left buckling component comprises a first upper portion and a first lower portion, the right buckling component comprises a second upper portion and a second lower portion, the first lower portion and the second lower portion form the inserting end cooperatively, an end of the first lower portion bends to form a first protruding portion, an end of the second lower portion bends to form a second protruding portion, the second protruding portion is located above the first protruding portion, one of the first protruding portion and the second protruding portion comprises a tongue part, and the other of the first protruding portion and the second protruding portion comprises a sunken part for engaging with the tongue part;
   a second buckle for buckling with the first buckle, an installation slot being formed on the second buckle for receiving the inserting end, and a penetrating hole being further formed on the second buckle;
   an operating portion disposed on the second buckle, the operating portion comprising at least one extending part and a pressing part connected to the at least one extending part, and an indentation being formed on the second buckle for receiving the pressing part;
   a locking component fixedly connected to the at least one extending part of the operating portion, the locking component being configured to lock with or release from the engaging portion, wherein an end of the operating portion passes through the second buckle to fixedly connect with the locking component disposed in the installation slot, and the at least one extending part passes through the penetrating hole to connect with the locking component; and
   a resilient portion being biased to separate the inserting end from the installation slot, the operating portion being operated to drive the locking component to release from the engaging portion, and the inserting end separating from the installation slot by the resilient portion, so as to unlock the first buckle and the second buckle.

2. The buckle assembly of claim 1, wherein a recovering portion is installed between the pressing part and the indentation for biasing the pressing part to separate from the indentation.

3. The buckle assembly of claim 2, wherein a positioning notch is formed in the indentation for positioning the recovering portion.

4. The buckle assembly of claim 1, wherein a receiving portion is formed on the second buckle, the inserting end is located between the locking component and the operating portion, and the operating portion is operated to drive the locking component to the receiving portion so as to release from the engaging portion.

5. The buckle assembly of claim 1, wherein a hook slot is recessed inwardly on the inserting end to form the engaging portion.

6. The buckle assembly of claim 1, wherein the second buckle comprises a buckling body and a cover engaged with the buckling body.

7. The buckle assembly of claim 6, wherein the buckling body comprises a latching part, and the cover comprises a blocking part for engaging with the latching part.

8. The buckle assembly of claim 1, wherein the first upper portion and the second upper portion are arranged in a left and right direction, and the first lower portion and the second lower portion are arranged in a forward and backward direction.

9. The buckle assembly of claim 1, wherein the first protruding portion comprises the tongue part, and the second protruding portion comprises the sunken part for engaging with the tongue part.

10. The buckle assembly of claim 1, wherein a fixing portion is installed between a bottom of the inserting end and the resilient portion, and the resilient portion pushes the fixing portion to move toward the inserting end.

11. A buckle assembly comprising:
   a first buckle comprising an inserting end whereon an engaging portion is formed;
   a second buckle for buckling with the first buckle, an installation slot being formed on the second buckle for receiving the inserting end, and a penetrating hole being further formed on the second buckle;
   an operating portion disposed on the second buckle, the operating portion comprising at least one extending part and a pressing part connected to the at least one extending part, and an indentation being formed on the second buckle for receiving the pressing part;
   a locking component fixedly connected to the at least one extending part of the operating portion, the locking component being configured to lock with or release from the engaging portion, wherein an end of the operating portion passes through the second buckle to fixedly connect with the locking component disposed in the installation slot, and the at least one extending part passes through the penetrating hole to connect with the locking component; and
   a resilient portion being biased to separate the inserting end from the installation slot, the operating portion being operated to drive the locking component to release from the engaging portion, and the inserting end separating from the installation slot by the resilient portion, so as to unlock the first buckle and the second buckle.

* * * * *